United States Patent [19]

Kim

[11] Patent Number: 5,396,836
[45] Date of Patent: Mar. 14, 1995

[54] DETACHABLE CONNECTING APPARATUS OF SQUEEZING ROLLER HOUSING FOR JUICE EXTRACTOR

[76] Inventor: Jong Gill Kim, Banpo town villa 201, 104-9, Banpo-3-dong, Sucho-ku, Seoul, Rep. of Korea

[21] Appl. No.: 109,978

[22] Filed: Aug. 6, 1993

[51] Int. Cl.⁶ .................. A23L 1/212; A23L 2/06; A23N 1/02
[52] U.S. Cl. .................. 99/510; 99/495; 99/513; 241/101.2; 241/260.1; 241/261
[58] Field of Search .......... 99/495, 509-513, 99/348; 100/37, 53, 98 R, 117, 145, 121; 241/92, 100.1, 101.2, 260.1, 261; 366/83-85, 272, 297, 301; 426/481, 482, 489, 518, 616, 51

[56] References Cited

U.S. PATENT DOCUMENTS

| | | | |
|---|---|---|---|
| 244,961 | 7/1881 | Wenzel | 99/510 |
| 3,533,563 | 5/1938 | Hartner | 99/495 |
| 3,779,522 | 12/1973 | Loomans | 366/85 |
| 4,025,056 | 5/1977 | Miles et al. | 366/272 |
| 4,073,013 | 2/1978 | Blach | 366/301 |
| 4,429,626 | 2/1984 | Ihara et al. | 100/117 |
| 4,440,074 | 4/1984 | Ihara et al. | 100/145 |
| 4,643,085 | 2/1987 | Bertocchi | 99/510 |
| 4,792,294 | 12/1988 | Mowli | 366/85 |
| 4,844,350 | 7/1989 | Larson | 241/261 |
| 4,846,054 | 7/1989 | Mange et al. | 99/495 |

FOREIGN PATENT DOCUMENTS 920465 4/1947 France ................... 99/510

*Primary Examiner*—Timothy F. Simone
*Attorney, Agent, or Firm*—Wenderoth, Lind & Ponack

[57] ABSTRACT

A juice extractor includes a main body equipped with a motor, a gear box having a first shaft and a second shaft to which torque of the motor is transmitted, a housing having a flange connecting surface at the front of the main body, and a pair of squeezing rollers accommodated by the housing and connected to the second shaft so as to receive torque therefrom. First and second clutch gears are alternatively connected to the first and second shafts by a clutching fork extending into the gear box. A connecting gear is connected to the clutch gears. A threaded portion extending to the front of the gear box from the connecting gear is received in a threaded hole in the housing to enable the housing to be separated from the main body.

2 Claims, 5 Drawing Sheets

DETACHABLE CONNECTING APPARATUS OF SQUEEZING ROLLER HOUSING FOR JUICE EXTRACTOR

BACKGROUND OF THE INVENTION

The present invention relates to a mechanism for detachably securing a squeezing roller housing to a main body of a juice extractor, and to such a mechanism which is located adjacent a main body of the juice extractor and enables the squeezing roller housing to be easily detached from the main body of the juice extractor by utilizing the power of the motor driving a pair of squeezing rollers of the juice extractor.

In general, a juice extractor comprises a main body equipped with an electric motor as a power source, and a housing equipped with a pair of squeezing rollers, which is connected to the front of the main body and to which the power of the motor is supplied. Raw juice containing materials, such as vegetables and fruits, are supplied to the juice extractor, compressed by the squeezing rollers in the housing, and discharged from the extractor by separating pure juice from dregs. In this juice extractor, residual dregs are always produced within the housing thereof, and in order to use the juice extractor the next time, it should be washed with water after use. Conventionally, the housing may be detached from the main body for this purpose. Typically, a bolt-nut assembly or a clip assembly is used. Also, for example, U.S. Pat. No. 5,156,872 (Moon H LEE) discloses a juice extractor in which the housing is constituted by a first section integral with the main body, and a second section to which the first section is connected. The first and second sections of the housing are connected by a closing means comprising two parts of a clip. However, such a closing means disclosed in the aforesaid U.S. Patent is relatively complicated and is aesthetically unpleasing as it is located on the circumference of the housing.

SUMMARY OF THE INVENTION

An object of the present invention is to provide a means for easily detaching a housing from a main body by utilizing the power of a motor disposed within the main body and driving a squeezing roller mounted in the housing. According to the juice extractor, a gear box having a first shaft and a second shaft provided at the front of a main body equipped with a motor such that torque of the motor is transmitted to the shafts, and a flange connecting surface of a housing faces the front of the main body such that a pair of squeezing rollers within the housing receive torque transmitted through the second shaft. A first clutch gear and a second clutch gear can be alternatively connected to the first and second shafts by a clutching fork. A connecting gear is connected to the clutch gears. A threaded portion extends from the connecting gear to the front of the gear box where it is received in a threaded hole in the housing, whereby the housing is detachably connected to the main body.

Further, the rotational speed of the second shaft is slower than that of the first shaft. The housing is connected to the main body when the first clutch gear is coupled to the first shaft, and the housing is separated from the main body when the second clutch gear is coupled to the second shaft.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
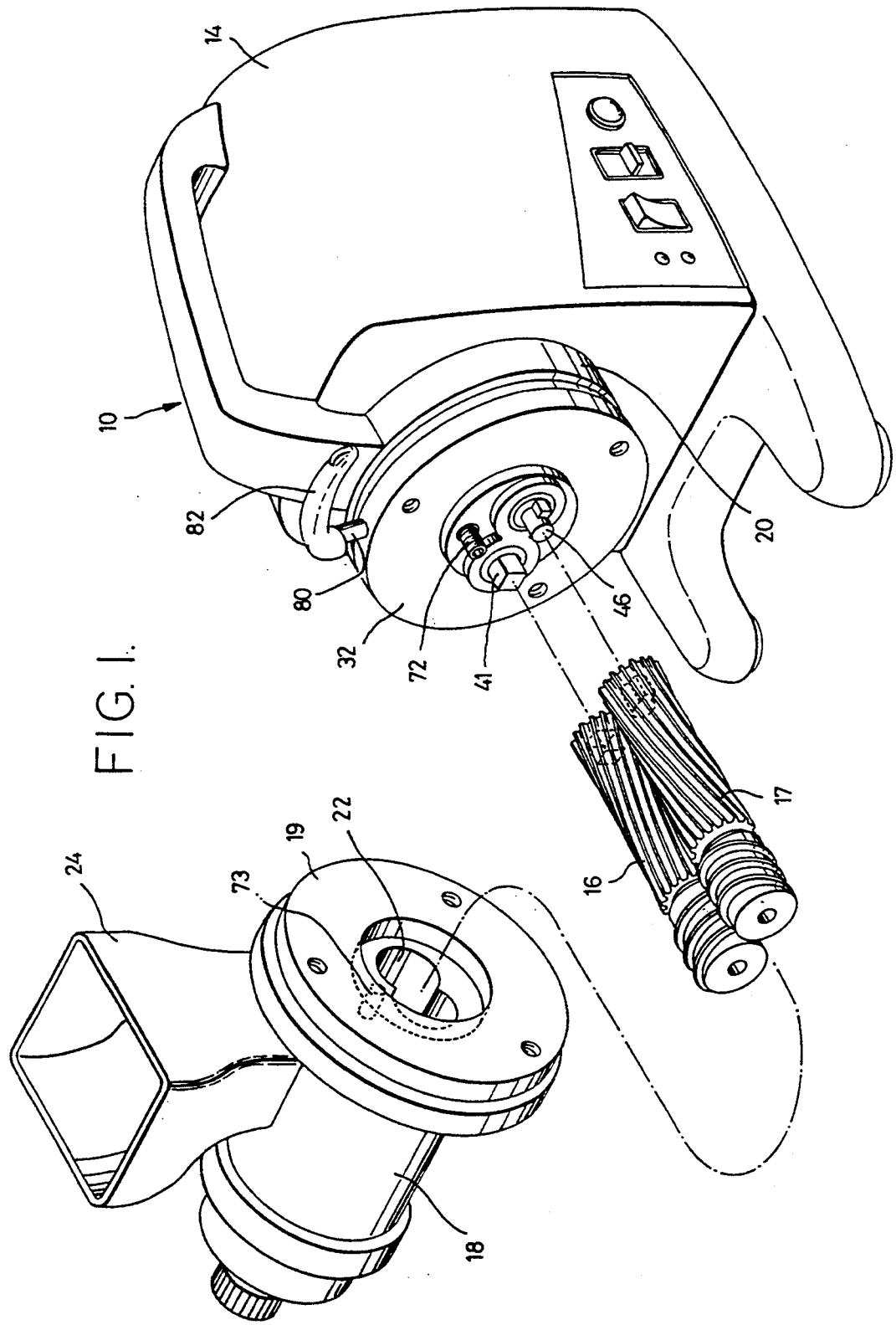
FIG. 1 is an exploded perspective view of a juice extractor according to the present invention.
Figure 2:
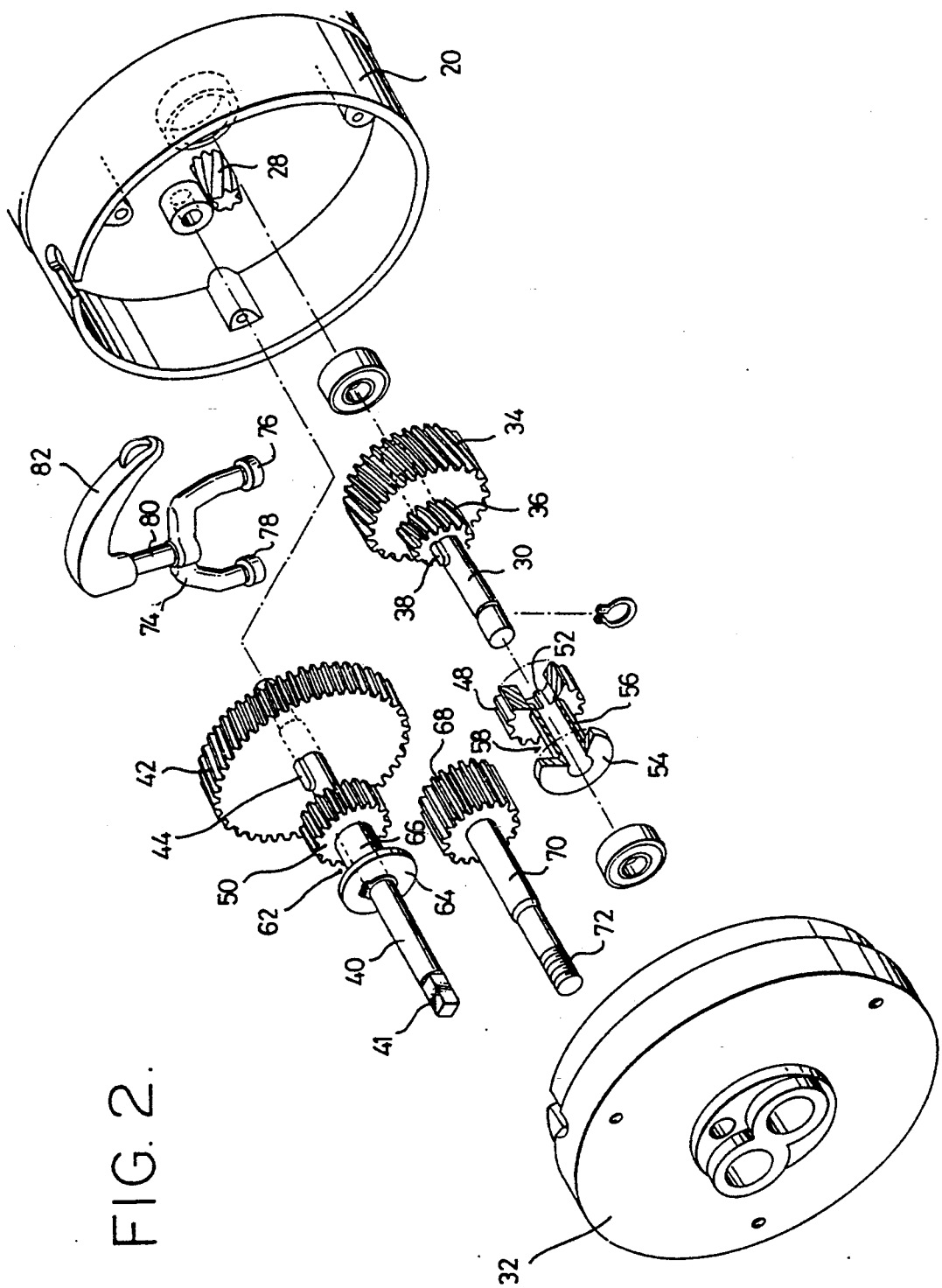
FIG. 2 is an exploded perspective view of a gear box portion of the present invention.
Figure 3:
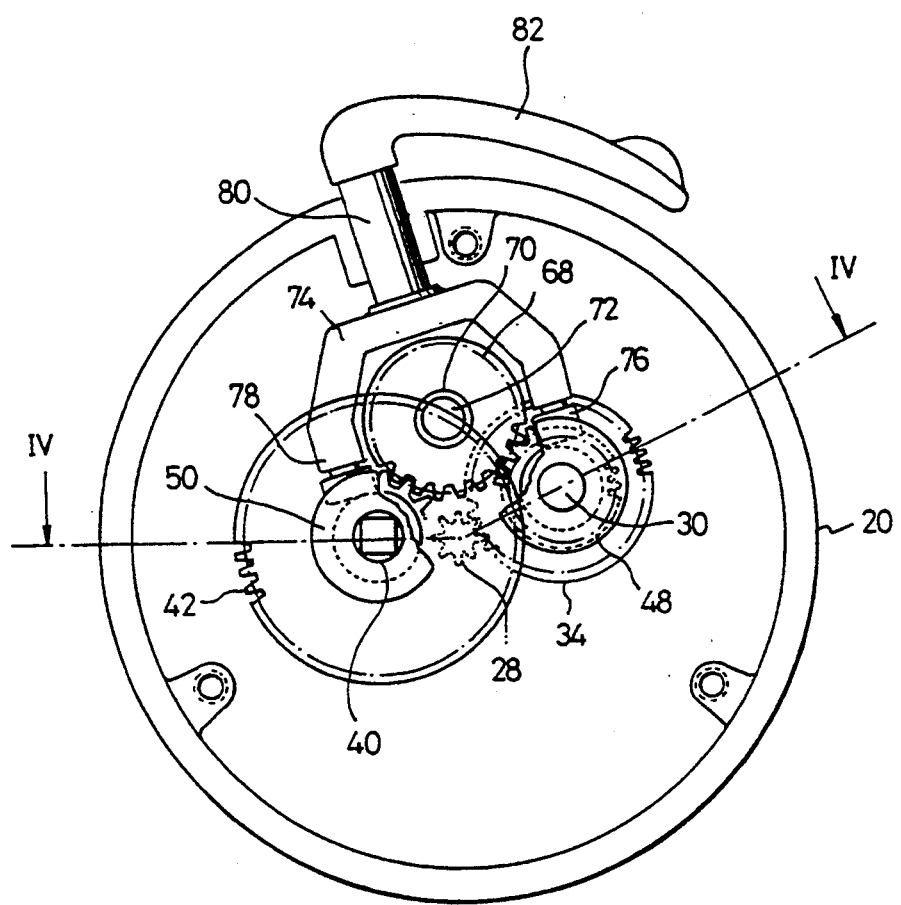
FIG. 3 is a cross-sectional view of the gear box portion of the present invention.
Figure 4:
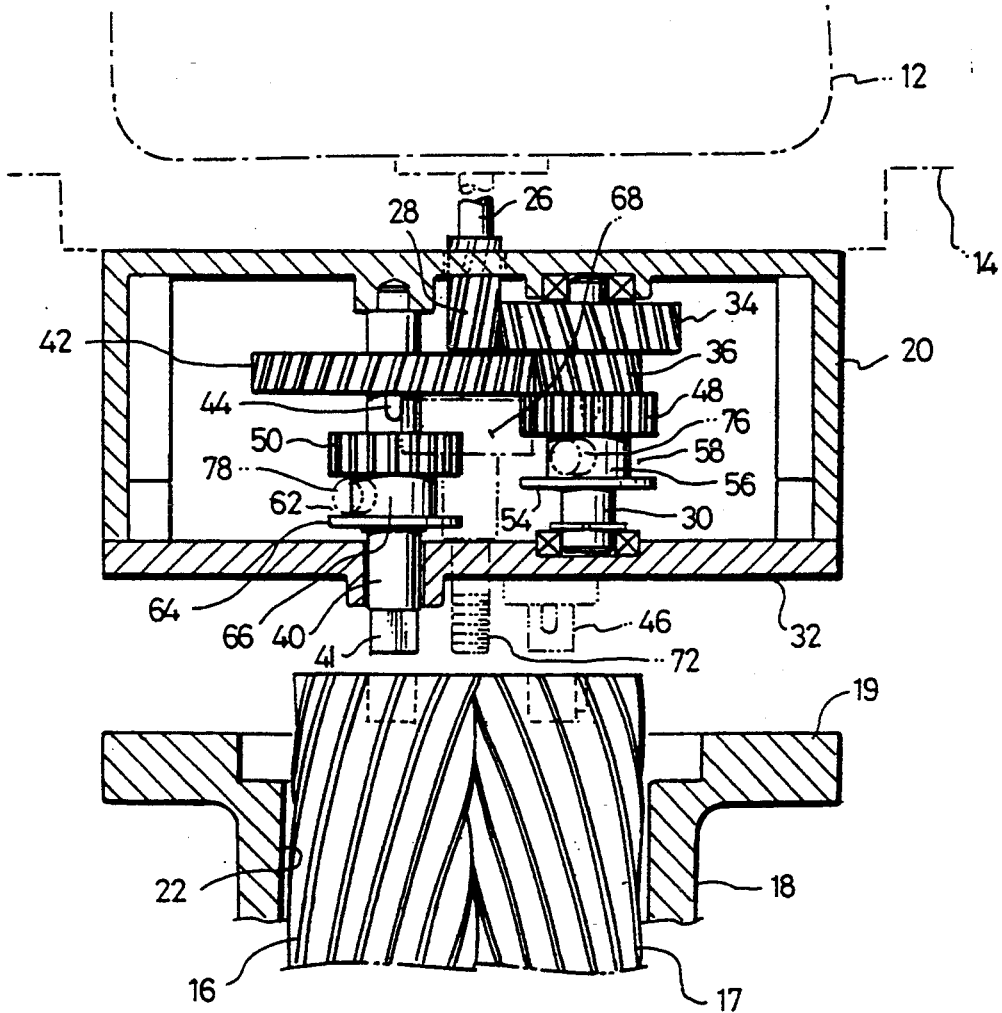
FIG. 4 is a longitudinal sectional view of the gear box portion taken along line IV—IV of FIG. 3 and illustrating a state for connecting a housing of the juice extractor to the main body thereof.
Figure 5:
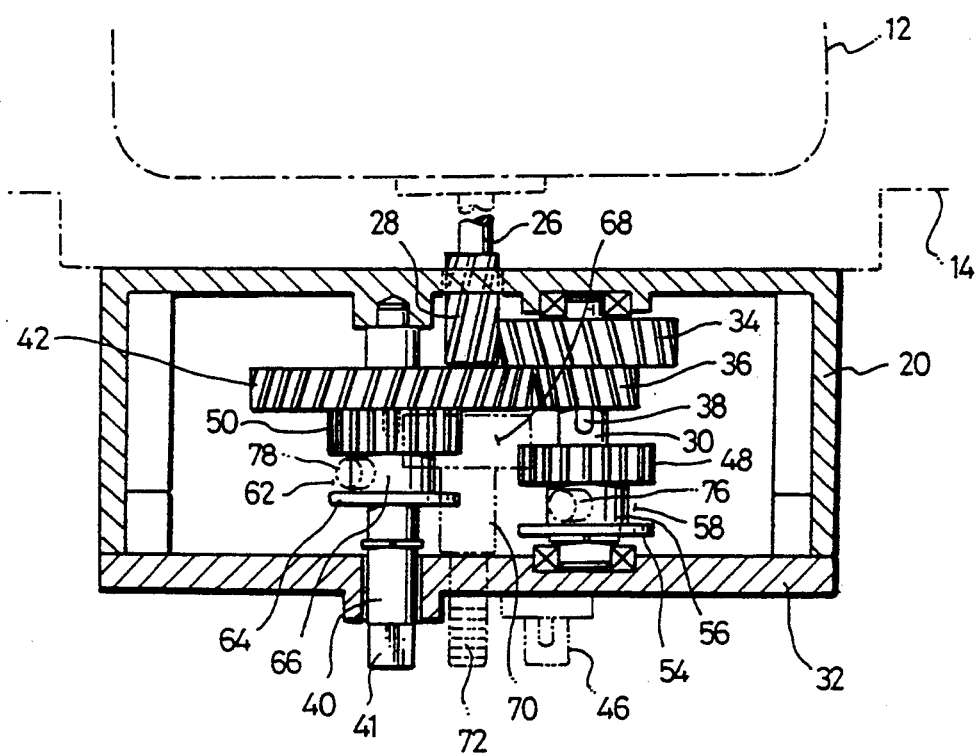
FIG. 5 is a view similar to FIG. 4 but illustrating a state in which the housing will become separated from the main body.

The constitution, operation and effects of the present invention will be described in detail referring to the attached drawings. FIG. 1 illustrates the major elements of a juice extractor 10, with the juice extractor comprising a main body 14 equipped with a motor 12, and a housing 18 equipped with a pair of squeezing rollers 16. A gear box 20, which will be described hereinafter, is integral with the front of the main body 14. The housing 18 comprises a cylinder 22 accommodating the pair of squeezing rollers 16, 17, and a supply hopper 24 for the raw juice-containing material.

A rotary axle 26 of the motor 12 extends at the front of the main body 14 and a helical gear 28 having a small diameter is integral with the end of the axle 26. A first shaft 30 extends in the gear box 20 adjacent axle 26. One end of the first shaft 30 is located at a lower part of the gear box 20 and the other end thereof is located at a front cover plate 32 of the gear box 20. A first helical gear 34 having a large diameter and engaging the helical gear 28 having a small diameter, and a second helical gear 36 having a smaller diameter than the first helical gear 34, are integral with the first shaft 30. A key 38 is integrally formed at the front of the second helical gear 36.

Further, a second shaft 40 extends adjacent to the helical gear 28. The second shaft 40 is disposed opposite the first shaft 30 in the radial direction of the gear box 20. One end of the second shaft 40 is located at the lower surface of the gear box 20 and the other end thereof extends through the front cover plate 32 to an end 41 having a polygonal cross section. The squeezing roller 16 is connected to the end 41 of shaft 40. A third helical gear 42 having a large diameter, and engaging the second helical gear 36 integral with the first shaft 30, is integral with the second shaft 40. A key 44 is formed at the front of the helical gear 36.

Accordingly, the first shaft 30 and the first and second helical gears 34, 36 integral therewith, and the second shaft 40 and the third helical gear 42 integral therewith comprise a decelerator in which torque transmitted from the rotary axle 26 of the motor is decelerated and is transmitted to the squeezing rollers 16, 17 through the end 41 of the second shaft 40.

The squeezing roller 17 is connected at the front cover plate 32 to a rotary supporting rod 46 independently of the decelerator mentioned above. In the decelerator mentioned above, torque is transmitted, in turn, through the first helical gear 34, the second helical gear 36 and the third helical gear 42, and the rotational speed of the first shaft 30 is greater than that of the second shaft 40.

According to the present invention, a first clutch gear 48 and a second clutch gear 50 are supported on the first shaft 30 and the second shaft 40, respectively.

The first clutch gear 48 can be coupled by the key 38 to the first shaft 30. A key 52 is integral with the first clutch gear 48 for coupling the first clutch gear 48 to the first shaft 30 (described below). A sleeve 56 having a flange 54 at its front end extends from the gear 48 and key 52. Accordingly, an annular groove 58 is formed between the flange 54 and side of the clutch gear 48.

Similar to the first clutch gear 48, the second clutch gear 50 has a key for engaging the key 44 of the second shaft 40, and a sleeve 66 having a flange 64 forming an annular groove 62 with the clutch gear 50 extends from the clutch gear 50.

These first and second clutch gears 48, 50 are axially movable along the first and second shafts 30, 40, respectively, between the second and third helical gears 36, 42, and the inner front cover plate 32.

For example, as the first clutch gear 48 approaches the second helical gear 36, the key 38 of the shaft 30 engages the key 52 of the clutch gear 48, and thus the first shaft 30 and the first clutch gear 48 are mechanically coupled together, whereby the clutch gear 48 rotates together with the shaft 30. If the clutch gear 48 is moved toward the front cover plate 32, the key 38 of the shaft 30 is separated from the key 52 of the clutch gear 48. As the second clutch gear 50 approaches the third helical gear 42 on the second shaft 40, it becomes coupled to the second shaft 40, and as the second clutch gear moves away from the third helical gear 42 toward the front cover plate 32, it becomes separated therefrom.

A connection gear 68 is connected to the first and second clutch gears 48, 50 which are supported by the first and second shafts 30, 40. A stud 70 integral with the connection gear 68 extends toward the front of the main body 14 passing through the front cover plate 32, and a threaded portion 72 is formed at the end of the stud 70. This threaded portion is received in a threaded hole 73 extending from a flange connecting surface 19 of the housing 18 to the top of the cylinder 22.

A means for axially moving the first and second clutch gears 48, 50 so as to become coupled to each of the first and second shafts 30, 40 is a clutching fork 74. The clutching fork 74 comprises branches 76, 78 received in each of the annular grooves 58, 62, respectively, and an actuating rod 80 extending toward the top of the gear box 20 from the tops of the branches 76, 78. An actuating lever 82 is disposed at the upper end of the actuating rod 80. When the actuating lever 82 of the clutching fork 74 is rotated clockwise or counterclockwise, the first clutch gear 48 is coupled to the first shaft 30 or separated therefrom while the second clutch gear 50 is separated from the second shaft 40 or is coupled thereto.

Once the first clutch gear 48 is coupled to the first shaft 30 by actuating the clutching fork 74, torque of the first shaft 30 is transmitted to the connection gear 68 through the first clutch gear 48, the threaded portion 72 of stud 70 rotates and the flange connecting surface 19 of the housing 18 is brought close to the front of the main body 14, i.e. the front cover plate 32, thereby connecting the housing 18 to the main body 14. Once the housing 18 is connected to the main body 14, the clutching fork 74 is placed at a neutral position.

As for the first and second clutch gears 48, 50, the keys 52, 60 thereof are not engaged with the keys of the first and second shafts 30, 40. Thus, torque of the shafts 30, 40 is not transmitted to the clutch gears 48, 50 and the connection gear 68 is in a standby state wherein the connection of the housing 18 to the threaded portion 72 of the stud 70 is maintained. After that, compression of the raw juice containing materials by the squeezing rollers can be achieved by transmitting the power of the motor 12 to the squeezing rollers 16, 17 through the first and second shafts 30, 40.

Conversely, for separating the housing 18 from the main body 14, the threaded portion 72 of the connection gear 68 is rotated in reverse. Further, the threaded portion 72 should be reversely rotated with greater force than the force used for connecting the threaded portion 72 to the housing 18, i.e. for connecting the housing 18 to the main body 14. To do this, the second clutch gear 50 having a smaller speed of rotation than clutch gear 48 is used. That is, by actuating the clutching fork 74, the second clutch gear 50 connected to its branch 78 is mechanically coupled to the second shaft 40, and thus torque of the second shaft 40 is transmitted to the connection gear 68 through the second clutch gear 50. This connection gear 68 reversely rotates and as the threaded portion 72 is separated from the threaded hole 73 of the housing 18, the flange connecting surface 19 is separated from the front of the main body 14 thereby separating the housing 18 from the main body 14.

I claim:

1. A juice extractor comprising: a main body equipped with a motor; a gear box located at a front end of said main body, said gear box including a first shaft and a second shaft connected to said motor so as to receive torque from said motor; a housing detachably connected to said main body, said housing having a flange connecting surface facing the front end of the main body, and a threaded hole in said surface; a pair of squeezing rollers accommodated within said housing and connected to said second shaft so as to receive torque therefrom, and a detaching mechanism comprising first and second clutch gears couplable to said first and second shafts, respectively, a clutching fork extending from outside said gear box into said gear box and being connected to said clutch gears, actuation of said clutching fork moving a selected one of said clutch gears into a coupled state with a respective one of the first and second shafts, a connecting gear connected to the clutch gears, and a threaded portion extending from said connecting gear to the front of the gear box, said threaded portion being received in said threaded hole in the flange connecting surface of said housing to enable separation of the housing from the main body.

2. A juice extractor as set forth in claim 1, wherein said gear box is configured such that said second shaft rotates at a speed slower than that of said first shaft, and wherein threads of said threaded portion and of the threaded hole cause said housing to become connected to said main body when said first clutch gear is coupled to the first shaft, and causes the housing to separate from the main body when said second clutch gear is coupled to the second shaft.

* * * * *